United States Patent
Shi (10) Patent No.: US 9,268,535 B2
(45) Date of Patent: Feb. 23, 2016

(54) SYSTEM AND METHOD FOR COMPUTER PROGRAMMING WITH PHYSICAL OBJECTS ON AN INTERACTIVE SURFACE

(71) Applicant: Zheng Shi, Beijing (CN)

(72) Inventor: Zheng Shi, Beijing (CN)

( * ) Notice: Subject to any disclaimer, the term of this patent is extended or adjusted under 35 U.S.C. 154(b) by 0 days.

(21) Appl. No.: 14/561,959

(22) Filed: Dec. 5, 2014

(65) Prior Publication Data

US 2015/0095883 A1   Apr. 2, 2015

Related U.S. Application Data

(63) Continuation-in-part of application No. PCT/CN2014/081721, filed on Jul. 7, 2014, which is a continuation-in-part of application No. PCT/CN2014/080317, filed on Jun. 19, 2014, which is a continuation-in-part of application No. PCT/CN2014/079891, filed on Jun. 13, 2014, which is a continuation-in-part of application No. PCT/CN2014/072961, filed on Mar. 6, 2014, which is a continuation-in-part of application No. PCT/CN2014/071850, filed on Jan. 30, 2014, which is a continuation-in-part of application No. PCT/CN2013/072481, filed on Mar. 12, 2013.

(51) Int. Cl.
*G06F 3/048* (2013.01)
*G06F 17/30* (2006.01)
*G06F 9/44* (2006.01)
*G06F 11/36* (2006.01)

(52) U.S. Cl.
CPC *G06F 8/34* (2013.01); *G06F 3/048* (2013.01); *G06F 11/362* (2013.01)

(58) Field of Classification Search
CPC ........... A61B 5/02154; A61B 5/02156; A61B 5/02158; A61B 5/024; A61B 5/031; G06F 8/34; G06F 11/263; G06F 3/048
See application file for complete search history.

(56) References Cited

U.S. PATENT DOCUMENTS

| | | | | |
|---|---|---|---|---|
| 8,463,184 B2* | 6/2013 | Dua | ................. | G06F 17/30058 340/10.51 |
| 8,566,923 B2* | 10/2013 | Fredette | .................... | G06F 8/34 715/853 |
| 8,768,256 B2* | 7/2014 | Dua | ................. | G06F 17/30058 340/10.51 |
| 8,971,803 B2* | 3/2015 | Dua | ................. | G06F 17/30058 340/10.51 |
| 9,104,293 B1* | 8/2015 | Kornfeld | ............. | G06F 3/04817 |
| 2007/0188318 A1* | 8/2007 | Cole et al. | ................ | 340/539.13 |

(Continued)

FOREIGN PATENT DOCUMENTS

| CN | 2527324 | 12/2002 |
|---|---|---|
| CN | 101637655 | 2/2010 |

(Continued)

OTHER PUBLICATIONS

Iglesias et al., The elderly interacting with a digital agenda through an RFID pen and a touch screen, Oct. 2008, 8 pages.*

(Continued)

*Primary Examiner* — Thuy Dao
(74) *Attorney, Agent, or Firm* — Sheppard Mullin Richter & Hampton LLP (57) ABSTRACT

A system and method are provided for creating a computer program by building a physical structure with a plurality of objects in conjunction with an interactive surface that recognizes such objects and translates the physical structure into a computer program.

16 Claims, 6 Drawing Sheets

(56) References Cited

U.S. PATENT DOCUMENTS

| | | | |
|---|---|---|---|
| 2008/0084271 A1 | 4/2008 | Jaeger et al. | |
| 2009/0128296 A1 | 5/2009 | Han et al. | |
| 2011/0126119 A1* | 5/2011 | Young | G06F 17/30905 715/744 |
| 2014/0068553 A1* | 3/2014 | Balasubramanian | 717/109 |

FOREIGN PATENT DOCUMENTS

| | | |
|---|---|---|
| CN | 102455930 | 5/2012 |
| CN | 103092277 | 5/2013 |
| CN | 202933472 | 5/2013 |
| WO | WO2009149112 | 12/2009 |

OTHER PUBLICATIONS

Martinussen et al., Designing with RFID, Feb. 2009, 8 pages.*

Zhang et al., Learning environmental factors through playful interaction, Jun. 2010, 8 pages.*

International Search Report for PCT Application No. PCT/CN2013/072481 filed Mar. 12, 2013, dated Jan. 2, 2014.

International Search Report and Written Opinion for PCT Application PCT/CN2014/081721, filed Jul. 7, 2014, dated Nov. 14, 2014.

* cited by examiner

Not | And | Or | Xor

SYSTEM AND METHOD FOR COMPUTER PROGRAMMING WITH PHYSICAL OBJECTS ON AN INTERACTIVE SURFACE

CROSS-REFERENCE TO RELATED APPLICATIONS

This application is a continuation in part of International Patent Application No. PCT/CN2014/081721, entitled "System and Method for Computer Programming with Physical Objects on an Interactive Surface", filed on Jul. 7, 2014, which is a continuation in part of International Patent Application No. PCT/CN2014/080317, entitled "System and Method for Learning, Composing, and Playing Music with Physical Objects", filed on Jun. 19, 2014, which is a continuation in part of International Patent Application No. PCT/CN2014/079891, entitled "System and Method for Operating a Computer Program with Physical Objects", filed on Jun. 13, 2014, which is a continuation in part of International Patent Application No. PCT/CN2014/072961, entitled "System and Method for Identifying an Object's ID and Location Relative to an Interactive Board," filed on Mar. 6, 2014, which is a continuation in part to International Patent Application No. PCT/CN2014/071850, entitled "System and Method for Identifying an Object's ID and Location Relative to an Interactive Board," filed on Jan. 30, 2014, which is continuation in part of International Patent Application No. PCT/CN2013/072481, entitled "System and Method for Interactive Board," filed on Mar. 12, 2013. The entire disclosures of each of the above applications are incorporated herein by reference.

TECHNICAL FIELD

The present invention relates to creating and running a computer program for education, entertainment and productive purposes, and more specifically, an interactive surface that enables a user to use objects to create computer programs.

BACKGROUND

"Everybody in this country should learn how to program a computer . . . because it teaches you how to think."—Steve Jobs.

Computer programming is becoming a way of thinking and doing for the broader society, beyond the narrow confines of computer programming professionals, particularly as the Internet continues to be a transformative force in driving changes in almost every aspects of modern life. People are starting to learn computer programming at an ever-younger age, a trend encouraged and reinforced by programming tools and platforms specifically developed for younger children or beginners.

Currently there are a number of programming tools and platforms that enable the creation of interactive stories, games, and animations, and the sharing of such creations in the online community. Their stated aim is to help young people learn to think creatively, reason systematically, and work collaboratively. Many games running on smart phones or tablet computers have also been developed that aim to further reduce the entry barrier for programming, and to teach the ways of logical thinking, to children as young as 4 years of age, often without much focus on writing programming code.

However, despite all these efforts, learning to program a game is still not intuitive and less fun than playing one, and it is desirable to develop ways that make programming fun and intuitive. Currently, most if not all of the programming tools and games are screen-based—they require users to interact with an electronic screen, whether it is on a laptop computer, a smart phone, or a tablet computer. An off-screen and physical building blocks-based system and method would be desirable, especially for young children whose parents desire to stimulate the children's interest in structured thinking and logical reasoning but at the same time wish to reduce the children's time spent with electronic screens.

SUMMARY OF INVENTION

The present invention discloses a novel way of creating and running a computer program with physical objects, in conjunction with an interactive surface. The interactive surface is configured to recognize the physical objects that have been placed on the surface, and create a computer program based on the structure pattern formed by the physical objects.

In accordance with embodiments of the present invention, a user places a plurality of physical objects on an interactive surface. Each of the physical objects comprises an identifier that comprises the ID information of the object. The physical objects are placed next to each other or on top of each other to form a structural pattern. The interactive surface is configured to recognize the ID, location and orientation of the physical objects, and to derive a structural pattern from such ID, location and orientation information, and to create a computer program based on such structural pattern.

In accordance with embodiments of the present invention, each of the physical objects is assigned a computer programming symbol. After a plurality of physical objects have been placed on an interactive surface, a processor that is operatively linked to the interactive surface receives information regarding the physical objects and retrieves the corresponding programming symbol from a database of correlation relationship between an identifier and a programming symbol stored in a memory that is operatively linked to the processor.

In accordance with embodiments of the present invention, the processor generates the computer program from the programming symbols embedded in the structural pattern that is formed by a plurality of physical objects on an interactive surface.

In accordance with embodiments of the present invention, the object may be a button, a card, a block, a figurine, or another 2D or 3D block structure that are amenable to be placed next to each other to form clearly recognizable 2D or 3D structural patterns.

In accordance with embodiments of the present invention, the programming symbol may represent any of the following symbols: movement; control statement; Boolean operator; action; subroutine; and arithmetic operator.

In accordance with embodiments of the present invention, the object can also be a physical sheet placed on top of the interactive surface, with printed information on such physical sheet providing information regarding the computer program to be created, with programming symbol on such physical sheet that is used together with programming symbols from other objects to derive the computer program, and with an identifier that is embedded in the physical sheet that allows the processor to be configured to create this specific computer program, according to one embodiment of the present invention.

In accordance with embodiments of the present invention, sensory accessories are operatively linked to the processor and provide interactive feedback to the user.

In accordance with the embodiments of the present invention, a computer program can be created by placing a plurality of cards on an interactive surface, and the execution of the computer program controls the operation of an electronic device. Thus, the concept of computer programming can be learned in a fun and intuitive way.

DETAILED DESCRIPTION OF THE INVENTION

Reference will now be made in detail to various embodiments of the invention, examples of which are illustrated in the accompanying drawings. While the invention will be described in conjunction with the embodiments, it will be understood that this is not intended to limit the scope of the invention to these specific embodiments. The invention is intended to cover all alternatives, modifications and equivalents within the spirit and scope of invention, which is defined by the apprehended claims.

Furthermore, in the detailed description of the present invention, specific details are set forth in order to provide a thorough understanding of the present invention. However, it will be obvious to one of ordinary skill in the art that the present invention may be practiced without these specific details. In other instances, well known methods, procedures, components, and circuits are not described in details to avoid unnecessarily obscuring a clear understanding of the present invention.

The present invention may be better understood and its numerous objects and advantages will become apparent to those skilled in the art by reference to the accompanying drawings.

The embodiments of the present invention disclose a system and method for creating and running a computer program with physical objects, typically cards, in conjunction with the use of an interactive surface.

Figure 1:
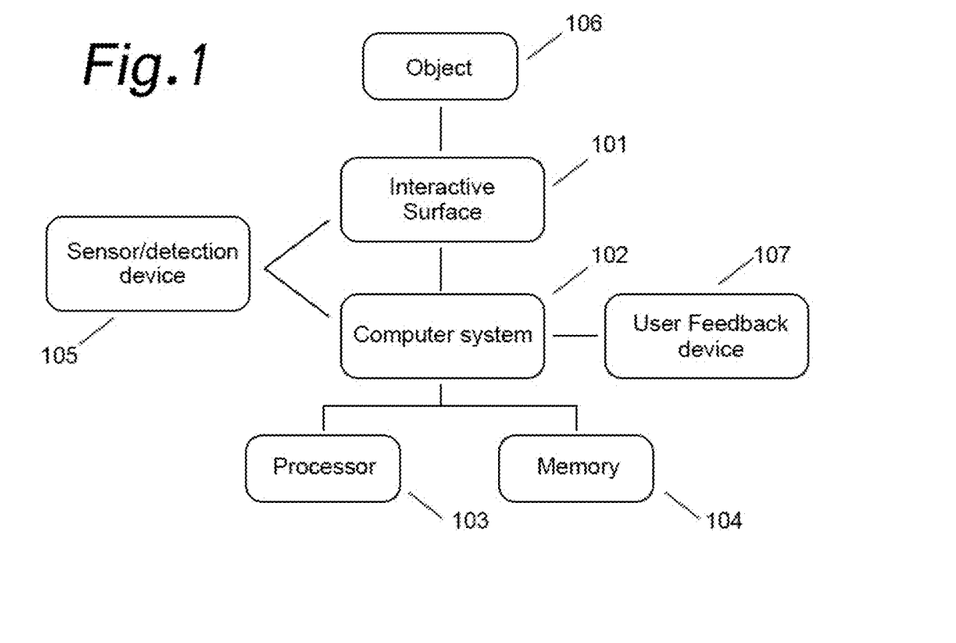
FIG. 1 is an exemplary schematic diagram illustrating the system process flow in accordance with one embodiment of the present invention.

FIG. 1 is an exemplary schematic diagram illustrating the system process flow in accordance with one embodiment of the present invention. The system includes an interactive surface 101 that is operatively linked to a computer system 102, which includes a processor 103 and a memory unit 104. The interactive surface 101 further includes a sensor or detection device 105 that is operatively linked to the computer system 102 of the interactive surface 101. The sensor or detection device 105 is configured to detect the location and unique ID of an object 106 placed on or near the interactive surface 101. The identifier of the object 106 may be a unique identification code (UID), and the UID can be encoded using a radio frequency identification chip, a pattern of capacitive tabs, or a pattern of magnetic tabs. The system described in FIG. 1 further includes a user feedback device 107 such as audio speakers and/or lighting devices that are operatively linked to the computer system 102.

Figure 2:
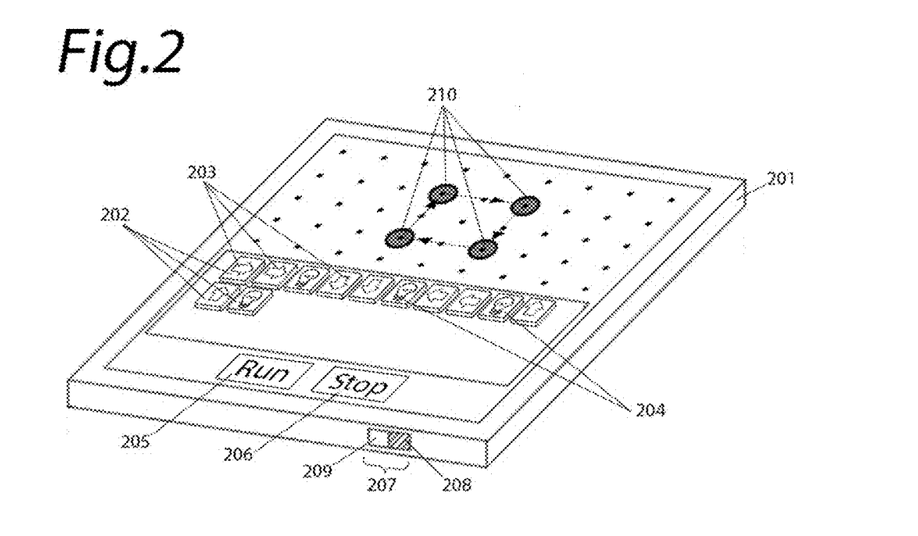
FIG. 2 is an exemplary schematic diagram of the system for creating a computer program in accordance with one embodiment of the present invention.

FIG. 2 is an exemplary schematic diagram of the system for creating a computer program in accordance with one embodiment of the present invention, which illustrates the process of creating a simple computer program using the system design in FIG. 1.

As shown in FIG. 2, two categories of cards 202 printed with programming symbols are placed on the interactive surface 201 to create a computer program that aims to light up the four corners of a square on the interactive surface. Specifically, "movement" cards 203 are used to program movement of an object in different directions, and "light bulb" card 204 is used to symbolize the action of lighting up any particular spot of the interactive surface 201. Two function buttons, namely the run button 205 and the stop button 206, are located at the bottom of the interactive surface 201 for the user to interact with.

In order to create a computer program using the system in FIG. 2, a user places various cards 202 next to each other on the interactive surface 201. Once the cards 202 are appropriately placed on the interactive surface 201, the sensor or detection device embedded the interactive surface 201 detects the ID of the cards 202 as well as their relative location on the interactive surface 201 and transmits this information to the computer system 207 that is operatively linked to the interactive surface 201 and includes a processor 208 and a memory unit 209. The computer system receives the information and retrieves the corresponding programming symbols assigned to cards 202 from a database of correlation relationship between an identifier and a programming symbol stored in a memory that is also operatively linked to the processor. Based on the structural pattern formed from these programming symbols retrieved, a computer program is generated by the processor of the computer system.

The user can run the computer program that he/she has created by pressing the play button 205, and the output is produced via a sensory accessory (in this case the LED light 210) that is operatively linked to the processor. The sensory accessory can also be an audio device, a video device, a camera or a vibration generator device. If the user is unsatisfied with the program created or would like to debug, he/she may simply press the stop button 206 first, and then add, remove, or change cards to re-generate a program. The sensory accessory can be arranged to produce an output to indicate the execution of the computer program. For example, an LED light may be attached to each card 202, and the LED light can be lighted when the code represented by that particular card 202 is being executed, which enables the user to visualize the execution of the computer program, and easily spot any code that does not execute as intended.

As illustrated in FIG. 2, with combination of the "movement" cards 203 and the "light bulb" card 204, four corners of a square are lit up in a clockwise manner wherever the starting spot is on the interactive surface 201. The sequence of the cards 202 used in this embodiment is as follows: "move right", "move right", "light bulb", "move down", "move down", "light bulb", "move left", "move left", "light bulb", "move up", "move up", "light bulb". The programming code generated from this sequence of the cards 202 can be represented as the following:

```
main( )
{
right( );
right( );
light( );
down( );
```

-continued

```
    down( );
    light( );
    left( );
    left( );
    light( );
    up( );
    up( );
    light( );
}
```

Each card 202 of the present invention is assigned with a different computer programming symbol. The programming symbols can take various forms and patterns and serve different functions. The cards can belong to the following categories: movement; control statement; Boolean operator; action; subroutine; and arithmetic operator.

FIGS. 3A, 3B, 3C, 3D, 3E, and 3F are exemplary schematic diagrams illustrating the design of cards each assigned with a programming symbol in accordance with various embodiments of the present invention.

1. Movement Cards

Figure 3A:
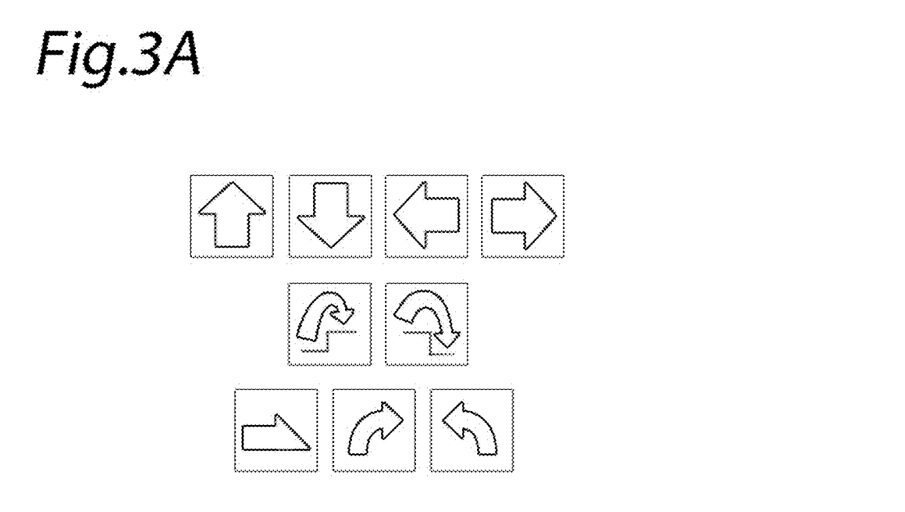
FIGS. 3A, 3B, 3C, 3D, 3E, and 3F are exemplary schematic diagrams illustrating the design of cards each assigned with a programming symbol in accordance with various embodiments of the present invention.
Figure 3B:
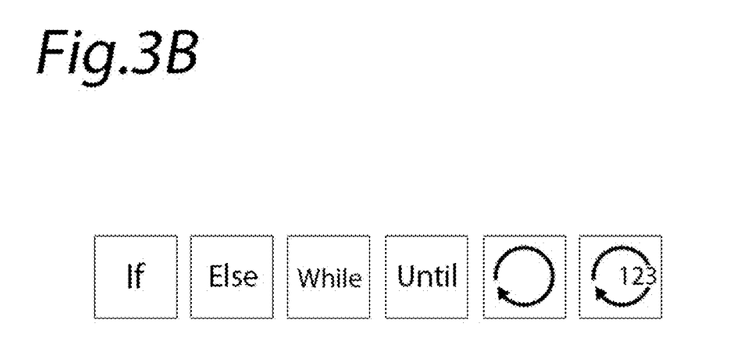

In FIG. 2, several movement cards are used in the present embodiment to simply represent movement of an object in different directions. As shown in FIG. 3A, the object could move up, down, left and right, could jump up and down, could keep moving forward, and could turn left right, 2. Control Statement Cards The execution of a program is controlled by various function statements. A few examples are given in FIG. 3B, including "If", "Else", "While", "Until", and "Loop" (and the number of "Loop").

3. Boolean Operator Cards

Figure 3C:
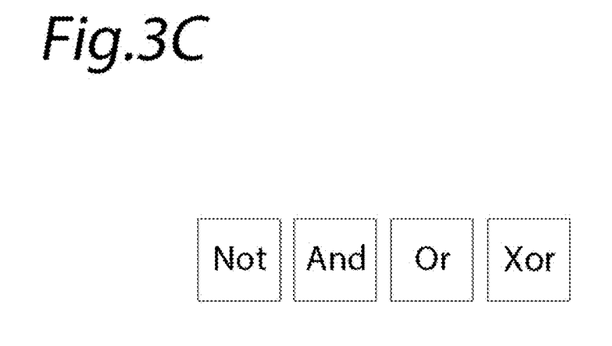

Boolean Operators are used in logical expressions to manipulate the value of true or false, which is then used to decide to step to the appropriate part of a computer program for its execution. The basic Boolean operator cards, i.e., "Not", "And", "Or", and "Xor", are illustrated in FIG. 3C.

4. Action Cards

Figure 3D:
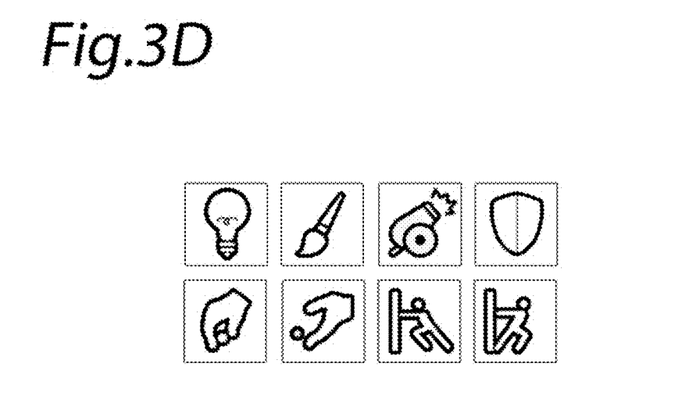

Simple actions can also be symbolized using the action cards. One card "Light Bulb" is already shown in FIG. 2. Other programming symbols may also include, "Paint", "Fire", "Shield Up", "Pick Up", "Drop", "Push", and "Drag", etc., as illustrated in FIG. 3D.

5. Subroutine Cards

Figure 3E:
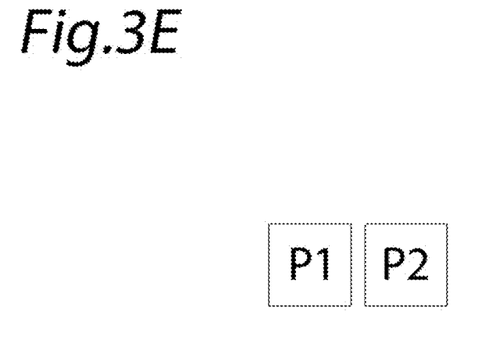

In computer programming, a subroutine is a sequence of program instructions that perform a specific task, packaged as a unit, depending on the programmer's definitions. This unit can then be used in programs wherever that particular task should be performed, which reduces a lot of workload of coding. Subroutines can simply be symbolized as "P1", "P2" . . . , by using the subroutine cards, as illustrated in FIG. 3E.

6. Arithmetic Operator Cards

Figure 3F:
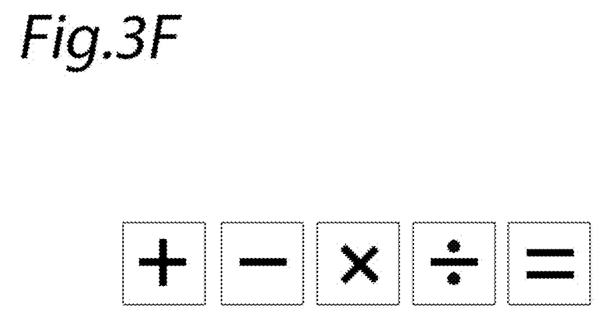

Arithmetic operators have been widely used in computer programming. The simplest arithmetic operator cards such as"+", "−", "×", "÷", and "=" are shown in FIG. 3F.

Despite the various categories of programming symbols that may be used for the interactive surface, for the sake of simplicity, the present invention will be described using only a few programming symbols described above to create a computer program in accordance with one of its embodiment.

Figure 4:
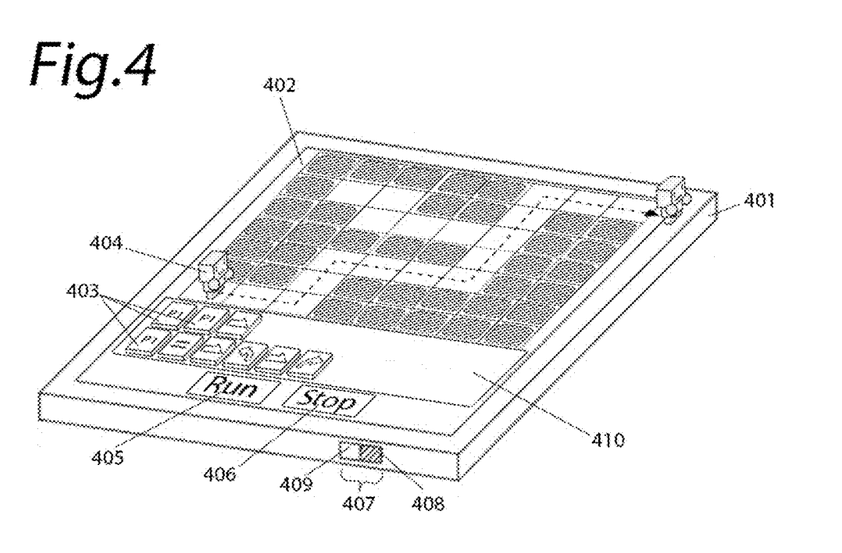
FIG. 4 is an exemplary schematic diagram of the system for creating a computer program using a physical sheet in accordance with one embodiment of the present invention.

FIG. 4 is an exemplary schematic diagram of the system for creating a computer program using a physical sheet in accordance with one embodiment of the present invention. As shown in FIG. 4, the system includes a physical sheet 402 with printed elements to lay out a maze placed on the interactive surface 401, and a set of cards 403 with programming symbols assigned to them neatly placed on the coding area 410 of the physical sheet 402. In this particular embodiment, a computer program is created from the structural pattern formed from programming symbols assigned to both the physical sheet 402 and the cards 403 placed on the sheet 402, to direct a robot 404 trapped in a maze out of the maze.

In addition to the movement cards used in the previous embodiment, this embodiment uses cards in other categories. For example, the subroutine card "P1", which is defined as a specific sequence of cards, is used to call a subroutine to reduce the number of cards used.

As shown in FIG. 4, a user places a physical sheet 402 with printed elements to lay out a maze and cards 403 next to each other in coding area 410 of the physical sheet 402. The sensor or detection device embedded the interactive surface 401 detects the ID and the relative location on the surface of the interactive surface 401 of both the cards 403 and the physical sheet 402, and transmit such information to the computer system 407 that is operatively linked to the interactive surface 401 and includes a processor 408 and a memory unit 409. The computer system receives the information and retrieves the corresponding programming symbols assigned to both the cards 403 and the physical sheet 402 from a database of correlation relationship between an identifier and a programming symbol stored in a memory that is also operatively linked to the processor. Based on the structural pattern formed from these programming symbols retrieved, the processor creates a computer program.

The execution of the program is via an electronic device operatively linked to the processor 408. In this embodiment of the present invention, the electronic device is a robot whose action is controlled by the computer program. In another embodiment of the present invention, the electronic device could be a computer and the computer program is executed by the computer.

The system can also include a sensory accessory (not shown), which can be arranged to produce an output to indicate the execution of the computer program. For example, an LED light may be attached to each card 403, and the LED light can be lighted when the code represented by that particular card 403 is being executed, which enables the user to visualize the execution of the computer program along with the operation of the electronic device, and easily spot any code that does not execute as intended.

As illustrated in FIG. 4, the execution of the created program created directs the robot 404 trapped in a maze out of the maze. The sequence of the cards used in this embodiment for coding the main program is as follows, "Procedure 1", "Procedure 1", and "move forward". The sequence of the cards that defines the subroutine P1 is as follows, "move forward", "turn left", "move forward", "turn right". The complete code generated from the sequence of the cards 403 can be represented as the following.

```
main( )
{
    proc1( );
    proc1( );
    moveForward( );
}
proc1( )
{
    moveForward( );
    turnLeft( );
    moveForward( );
    turnRight( );
}
```

Figure 5:
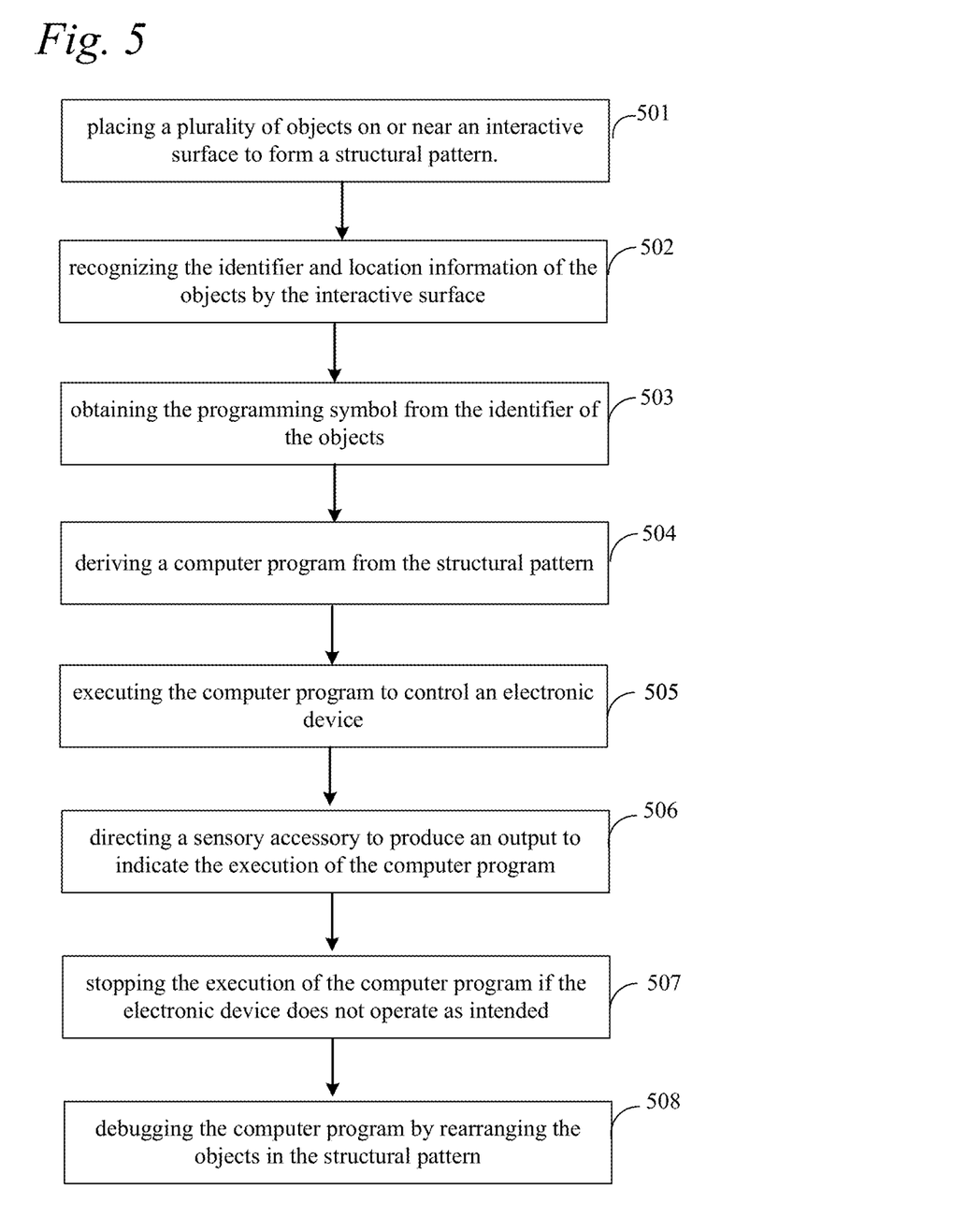
FIG. 5 is an exemplary schematic diagram for a method for creating and running a computer program flow in accordance with one embodiment of the present invention.

FIG. 5 is an exemplary schematic diagram for a method for creating and running a computer program flow in accordance with one embodiment of the present invention. As shown in FIG. 5, the method includes the following steps.

Step 501: placing a plurality of objects on or near an interactive surface to form a structural pattern. Each object includes identifier and is assigned a programming symbol.

Step 502: recognizing the identifier and location information of the objects by the interactive surface. The interactive surface includes a sensor or detection device that is operatively linked to a computer system, and the sensor or detection device is configured to detect the location and unique ID of objects on or near the interactive surface.

Step 503: obtaining the programming symbol from the identifier of the objects. A database of correlation relationship between identifier and programming symbol is stored in a memory, and the processor is configured to obtain a programming symbol for each object identifier.

Step 504: deriving a computer program from the structural pattern. The processor is configured to derive a computer program based on the location information and programming symbol of the objects forming the structural pattern. The computer program is a sequence of programming code represented by the programming symbols.

Step 505: executing the computer program to control an electronic device. For example, the user can push a Play button to execute the computer program, which can be used to control an electronic device, such as the moving of a robot as shown in FIG. 4. The electronic device can also be a computer.

Step 506: directing a sensory accessory to produce an output to indicate the execution of the computer program. The system may also include a sensory accessory, such as LED lights. For example, an LED light may be attached to each object, and the LED light can be lighted when the code represented by that particular object is being executed, which enables the user to visualize the execution of the computer program along with the operation of the electronic device.

Step 507: stopping the execution of the computer program if the electronic device does not operate as intended. For example, if the robot in FIG. 4 does not move in the intended path, the user can stop the execution of the program code by pushing a stop button.

Step 508: debugging the computer program by rearranging the objects in the structural pattern. The user can easily debut the computer program as the LED light will direct him to the object that is causing the program.

In accordance with the embodiments of the present invention, a computer program can be created by placing a plurality of objects on an interactive surface, and the execution of the computer program controls the operation of an electronic device. Thus, the concept of computer programming can be learned in a fun and intuitive way.

The invention claimed is:

1. A method for creating and performing a set of actions, comprising:
   placing a plurality of objects on or near an interactive surface to form a structural pattern, wherein each object comprises an identifier and is visually marked with a programming symbol, and wherein the identifier is encoded with a passive radio frequency identification (RFID) chip;
   recognizing the identifier, location and orientation information of an object by the interactive surface upon the object being placed on or near the interactive surface;
   obtaining, by a processor that is operatively linked to the interactive surface, the programming symbols of the objects from a memory that stores a database of correlation relationships among and between identifiers, programming symbols and actions;
   deriving, by the processor, a computer program that specifies a set of actions based on the programming symbols embedded in the structural pattern; and
   upon an object comprising a physical sheet being placed on top of the interactive surface, generating the computer program in accordance with information printed on the physical sheet.

2. The method of claim 1, wherein the programming symbol is selected from a group consisting of a movement symbol, a control symbol, a Boolean Operator, an arithmetic operator, and an action to be performed by a robot.

3. The method of claim 1, wherein the processor is configured to allow an end-user to work under a mode selected from a group consisting of creating, debugging, and executing.

4. The method of claim 3, further comprising, debugging the computer program by rearranging the structural pattern by the end-user.

5. The method of claim 1, wherein an object is selected from a group consisting of a card, a button, a block, an icon, a sheet, and figurine.

6. The method of claim 1, further comprising, directing, by the processor, a sensory accessory to produce an output to indicate the progress of execution of the set of actions by the computer program, wherein the sensory accessory is selected from a group consisting of an LED light, an audio device, a video device, and a vibration generator device.

7. The method of claim 1, further comprising, directing, by the processor, an electronic device to perform the set of actions through the computer program.

8. A method for creating and performing a set of actions, comprising:
   placing a plurality of objects on or near an interactive surface to form a structural pattern, wherein each object comprises an identifier and is visually marked with a programming symbol, and wherein the identifier is encoded with a passive radio frequency identification (RFID) chip;
   recognizing the identifier, location and orientation information of an object by the interactive surface upon the object being placed on or near the interactive surface;
   obtaining, by a processor that is operatively linked to the interactive surface, the programming symbols of the objects from a memory that stores a database of correlation relationships among and between identifiers, programming symbols and actions;
   deriving, by the processor, a computer program that specifies a set of actions based on the programming symbols embedded in the structural pattern;
   allowing an end-user to work under a mode selected from a group consisting of creating, debugging, and executing; and
   debugging the computer program by rearranging the structural pattern by the end-user.

9. A system for creating and performing a set of actions, comprising:
   a plurality of objects, wherein each object comprises an identifier and is visually marked with a programming symbol, and wherein the identifier is encoded with a passive radio frequency identification (RFID) chip;
   an interactive surface that is configured to recognize the identifier, location and orientation information of an object upon the object being placed on or near the interactive surface;
   a processor operatively linked to the interactive surface; and a memory operatively linked to the processor and configured to store a database of correlation relationships among and between identifiers, programming symbols and actions;

wherein upon a plurality of objects being placed on or near the interactive surface to form a structural pattern, the processor is configured to derive a computer program that specifies a set of actions based on the programming symbols embedded in the structural pattern; and wherein an object comprises a physical sheet placed on top of the interactive surface, and upon the physical sheet being placed on top of the interactive surface, the processor is configured to generate a computer program in accordance with information printed on the physical sheet.

10. The system of claim 9, wherein the programming symbol is selected from a group consisting of a movement symbol, a control symbol, a Boolean Operator, an arithmetic operator, and the action is performed by a robot.

11. The system of claim 9, wherein the processor is configured to allow an end-user to work under a mode selected from a group consisting of creating, debugging, and executing.

12. The system of claim 11, wherein processor is configured to debug the computer program upon the structural pattern being re-arranged.

13. The system of claim 9, wherein an object is selected from a group consisting of a card, a button, a block, an icon, a sheet, and a figurine.

14. The system of claim 9, further comprising of a sensory accessory selected from a group consisting of an LED light, an audio device, a video device, and a vibration generator device, wherein the processor is configured to direct a sensory accessory to produce an output to indicate the progress of execution of the set of actions by the computer program.

15. The system of claim 9, further comprising an electronic device that is operatively controlled by the processor, wherein the processor is configured to direct the electronic device to perform the set of actions through the computer program.

16. A system for creating and performing a set of actions, comprising:
a plurality of objects, wherein each object comprises an identifier and is visually marked with a programming symbol, and wherein the identifier is encoded with a passive radio frequency identification (RFID) chip;
an interactive surface that is configured to recognize the identifier, location and orientation information of an object upon the object being placed on or near the interactive surface;
a processor operatively linked to the interactive surface; and
a memory operatively linked to the processor and configured to store a database of correlation relationships among and between identifiers, programming symbols and actions;
wherein upon a plurality of objects being placed on or near the interactive surface to form a structural pattern, the processor is configured to derive a computer program that specifies a set of actions based on the programming symbols embedded in the structural pattern, to allow an end-user to work under a mode selected from a group consisting of creating, debugging and executing, and to debug the computer program upon the structural patter being re-arranged.

* * * * *